(12) United States Patent
Kim et al.

(10) Patent No.: US 11,288,486 B2
(45) Date of Patent: Mar. 29, 2022

(54) FINGERPRINT RECOGNITION OPTICAL FILM, AND BACKLIGHT UNIT AND LIQUID CRYSTAL DISPLAY DEVICE COMPRISING THE FILM OPTICAL

(71) Applicant: LMS Co., Ltd., Pyeongtaek-si (KR)

(72) Inventors: Hyeryong Kim, Pyeongtaek-si (KR);
Sejin Oh, Pyeongtaek-si (KR);
Dongcheol Lee, Pyeongtaek-si (KR);
Janghee Cho, Pyeongtaek-si (KR);
Jinyeon Choi, Pyeongtaek-si (KR);
Duyi Kim, Pyeongtaek-si (KR);
Jeehong Min, Pyeongtaek-si (KR);
Jinhwan Kim, Pyeongtaek-si (KR);
Dongmin Kim, Pyeongtaek-si (KR);
Taejun Lee, Pyeongtaek-si (KR);
Jihoon Lee, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 0 days.

(21) Appl. No.: 16/899,024

(22) Filed: Jun. 11, 2020

(65) Prior Publication Data
US 2020/0394382 A1  Dec. 17, 2020

(30) Foreign Application Priority Data

Jun. 12, 2019  (KR) .................. 10-2019-0069409
Mar. 17, 2020  (KR) .................. 10-2020-0032437

(51) Int. Cl.
*G06K 9/00* (2022.01)
*G02F 1/13357* (2006.01)
*G02F 1/1335* (2006.01)

(52) U.S. Cl.
CPC ... *G06K 9/00046* (2013.01); *G02F 1/133606* (2013.01); *G02F 1/133607* (2021.01)

(58) Field of Classification Search
CPC .. G06K 9/0004; G06K 9/00013; G06F 3/042; G06F 3/0421; G02F 1/133607; G02B 5/0231; G02B 6/0053; G02B 5/045
See application file for complete search history.

(56) References Cited

U.S. PATENT DOCUMENTS

| | | | |
|---|---|---|---|
| 2011/0130508 A1* | 6/2011 | Pendley | C09J 175/04 524/507 |
| 2012/0133618 A1* | 5/2012 | Usukura | G02F 1/13338 345/175 |
| 2012/0274873 A1 | 11/2012 | Lee | |
| 2013/0329455 A1* | 12/2013 | Mi | G02B 6/0036 362/607 |

(Continued)

FOREIGN PATENT DOCUMENTS

| | | | | |
|---|---|---|---|---|
| CN | 110088767 A | * | 8/2019 | ............... G06K 9/00 |
| JP | 2011-253111 A | | 12/2011 | |

(Continued)

OTHER PUBLICATIONS

Office Action issued for corresponding Korean Patent Application No. 10-2019-0069409 dated Jun. 29, 2020, citing above references.

(Continued)

*Primary Examiner* — Yuzhen Shen
(74) *Attorney, Agent, or Firm* — Hauptman Ham, LLP

(57) ABSTRACT

A fingerprint recognition optical film which transmits an infrared ray (IR) is introduced. The fingerprint recognition optical film may include a base film and a lens pattern layer including a plurality of lenses attached to one surface of the base film. Here, the plurality of lenses in the lens pattern layer are parallelly arranged with a predetermined distance and a flat pattern portion is formed among the lenses to transmit the infrared ray wherein a protrusion direction of the plurality of lenses is arranged to face to a light source.

17 Claims, 19 Drawing Sheets

(56) References Cited

U.S. PATENT DOCUMENTS

| | | | | |
|---|---|---|---|---|
| 2015/0062493 | A1* | 3/2015 | Yoon | G02B 6/0053 |
| | | | | 349/65 |
| 2015/0109561 | A1* | 4/2015 | Fuchida | G02B 5/3025 |
| | | | | 349/96 |
| 2015/0187980 | A1* | 7/2015 | Yamamoto | G06F 1/00 |
| | | | | 250/552 |
| 2017/0067593 | A1* | 3/2017 | Mitsumoto | C03C 17/3411 |
| 2018/0060642 | A1 | 3/2018 | Kim et al. | |
| 2018/0357402 | A1 | 12/2018 | Omata et al. | |
| 2019/0012512 | A1 | 1/2019 | He et al. | |
| 2019/0050621 | A1* | 2/2019 | Xu | G06K 9/0004 |
| 2020/0132917 | A1* | 4/2020 | Tsai | G02B 6/0068 |
| 2020/0209679 | A1* | 7/2020 | Ling | G02F 1/133565 |
| 2020/0379159 | A1* | 12/2020 | Li | G02B 5/0215 |

FOREIGN PATENT DOCUMENTS

| | | |
|---|---|---|
| KR | 10-2009-0030455 A | 3/2009 |
| KR | 10-1399165 B1 | 5/2014 |
| KR | 10-2014-0086061 A | 7/2014 |
| KR | 10-2015-0026044 A | 3/2015 |
| KR | 10-2015-0057461 A | 5/2015 |
| KR | 10-1683759 B1 | 12/2016 |
| KR | 10-1827018 B1 | 2/2018 |
| KR | 10-2019-0023937 A | 3/2019 |
| KR | 10-2019-0028939 A | 3/2019 |
| KR | 10-2036797 B1 | 10/2019 |
| WO | 2017-098758 A1 | 6/2017 |

OTHER PUBLICATIONS

Korean Notice of Allowance dated Jan. 11, 2021 in connection with the Korean Patent Application No. 10-2019-0069409 citing the above reference(s).

Korean Office Action dated May 20, 2021 in connection with the Korean Patent Application No. 10-2020-0032437 citing the above reference(s).

* cited by examiner

| PRISM DIST. | 51<br>0μm | 52<br>2μm | 53<br>4μm | 54<br>6μm |
|---|---|---|---|---|
| PRISM CROSS-SECTION<br>(Back Detector) |  |  |  |  |
| CENTER GAIN | 100% | 271% | 365% | 456% |
| FRONT DETECTOR |  |  |  |  |
| CENTER GAIN | 100% | 99% | 98% | 98% |

| PRISM DIST. | 6μm | 9μm | 12μm |
|---|---|---|---|
| FRONT DETECTOR |  |  |  |
| CENTER GAIN | 100% | 54.7% | 17.3% |

| HORIZONTAL LENGTH (μm) | | HORIZONTAL LENGTH RATIO | | VERTICAL LENGTH (μm) | | VERTICAL LENGTH RATIO | |
|---|---|---|---|---|---|---|---|
| $\ell$ | m | $\ell$ | m | x | y | x | y |
| 6 | 3.3 | 1.81 | 1 | 9.9 | 11.9 | 0.83 | 1 |
| 7 | 2.3 | 3.04 | 1 | 8.3 | 11.9 | 0.7 | 1 |
| 8 | 1.3 | 6.15 | 1 | 6.7 | 11.9 | 0.56 | 1 |

| EVALUATION ITEMS | 1ST STRUCTURE (121) | 2ND STRUCTURE (122) | 3RD STRUCTURE (123) |
|---|---|---|---|
| PRISM / FLAT PORTION(um) | 18 / 0 um | 11 / 7 um | 11 / 7 um |
| LIGHT DISPERSION | | | |
| CENTER BRIGHTNESS (%) | 100% | 111% | 82% |
| FWHM | 20° / 81° | 16° / 71° | 24° / 69° |

FINGERPRINT RECOGNITION OPTICAL FILM, AND BACKLIGHT UNIT AND LIQUID CRYSTAL DISPLAY DEVICE COMPRISING THE FILM OPTICAL

CROSS-REFERENCE TO RELATED APPLICATION(S)

This application is based on and claims priority under 35 U.S.C. § 119(a) to Korean Patent Application No. 10-2019-0069409, filed on Jun. 12, 2019, in the Korean Intellectual Property Office, and Korean Patent Application No. 10-2020-0032437, filed on Mar. 17, 2020 in the Korean Intellectual Property Office, the disclosure of each of which is incorporated by reference herein in its entirety.

BACKGROUND

Technical Field

The present invention relates a fingerprint recognition optical film, and more particularly, to an optical film for the fingerprint recognition capable of transmitting infrared rays.

Description of Related Art

Recently, portable electronic devices such as smartphones and tablet PCs have become commonly used. Since these portable electronic devices contain personal information such as a user's address, email, and financial information, it is important to secure security through user authentication.

User authentication technology is evolving as a method of using biometric information of a user. Here, the biometric information may be, for example, information such as a fingerprint, iris, face or voice. Especially, fingerprint authentication has been adopted for a majority of portable electronic devices due to its convenience and high security.

As a method of recognizing a fingerprint, electrostatic, ultrasonic and optical methods are typically used. Recently, a smartphone is equipped with a capacitive fingerprint recognition function based on a semiconductor sensor that shows a high recognition rate while maintaining a thin and small size so as not to affect the design. In addition, an ultrasonic fingerprint recognition function that recognizes a difference in height of a fingerprint by measuring the arrival time of the reflected ultrasonic waves after emitting ultrasonic waves is also embedded on a smartphone. However, a capacitive fingerprint sensor recognizes a very small size of a fingerprint area at a time compared to an optical fingerprint sensor, and thus has a higher false authentication rate than that of the optical type and thereby security may be slightly deteriorated. The ultrasonic type is relatively good in accuracy and durability, but it is somewhat difficult to manufacture and has disadvantages in terms of price.

On the other hand, the optical fingerprint method ensures high reliability and is excellent in durability, and it has been adopted in various electronic devices. The optical fingerprint recognition method can be divided into a so-called scattering method where a detector detects light scattered at the ridge portion of the fingerprint that directly contacts the transparent fingerprint contact portion of the device and a so-called total reflection method where a detector detects light totally reflected at the surface of the fingerprint contact portion corresponding to the valley portion of the fingerprint.

Unfortunately, an optical film included in a backlight unit of a small electronic device such as a smartphone has an extremely low infrared transmittance. As a result, an optical fingerprint recognition system using infrared for a small electronic device comprising a common optical film is unlikely to be adopted.

However, the present invention has offered to solve the above-mentioned problems, and an object of the present invention is to provide a fingerprint recognition optical film that effectively transmits infrared rays to enable optical fingerprint authentication using infrared rays even in small electronic devices such as smartphones.

SUMMARY

Accordingly, the object of the present invention is to provide a fingerprint recognition optical film for transmitting an infrared ray that comprises a base film and a lens pattern layer. The lens pattern layer includes a plurality of lenses attached to one surface of the base film and being parallelly arranged with a predetermined distance and a flat portion pattern formed among the plurality of lenses to transmit the infrared ray. A protrusion direction of the plurality of lenses is arranged to face to a light source.

Another object of the present invention is to provide a fingerprint recognition optical film that further comprises a base film and a lens pattern layer including a plurality of lenses attached to one surface of the base film and being parallelly arranged with a predetermined distance and a flat pattern portion formed among the lenses to transmit the infrared ray wherein a protrusion direction of the plurality of lenses is arranged to face to a light source and the flat portion pattern is formed to include a plurality of flat lines with a predetermined distance as a width and wherein the width of the plurality of flat lines is formed in a region corresponding to a location of a fingerprint and larger than the predetermined distance.

BRIEF DESCRIPTION OF DRAWINGS

FIG. 12 discloses the results of the performance test as to a fingerprint recognition optical film according to one embodiment of the present invention.

DETAILED DESCRIPTION OF PREFERRED EMBODIMENTS

Here, the operation principle of the preferred embodiment of the present invention will be described in detail with reference to the accompanying drawings. In addition, in describing embodiments of the present invention, when it is determined that detailed descriptions of related known functions or configurations may obscure the subject matter of the present disclosure, detailed descriptions will be omitted. In addition, terms used in the following are terms defined in consideration of functions in the present invention, which may vary according to a user's or operator's intention or practice. Therefore, the definition of terms used should be interpreted based on the contents throughout the specification and corresponding functions.

The optical film according to various embodiments of the present invention described below may be applied to backlight units of various types of liquid crystal display (LCD) devices. However, the optical film according to various embodiments of the present invention may be used alone or included in a means for providing a backlight in various devices other than a liquid crystal display device.

Figure 1:
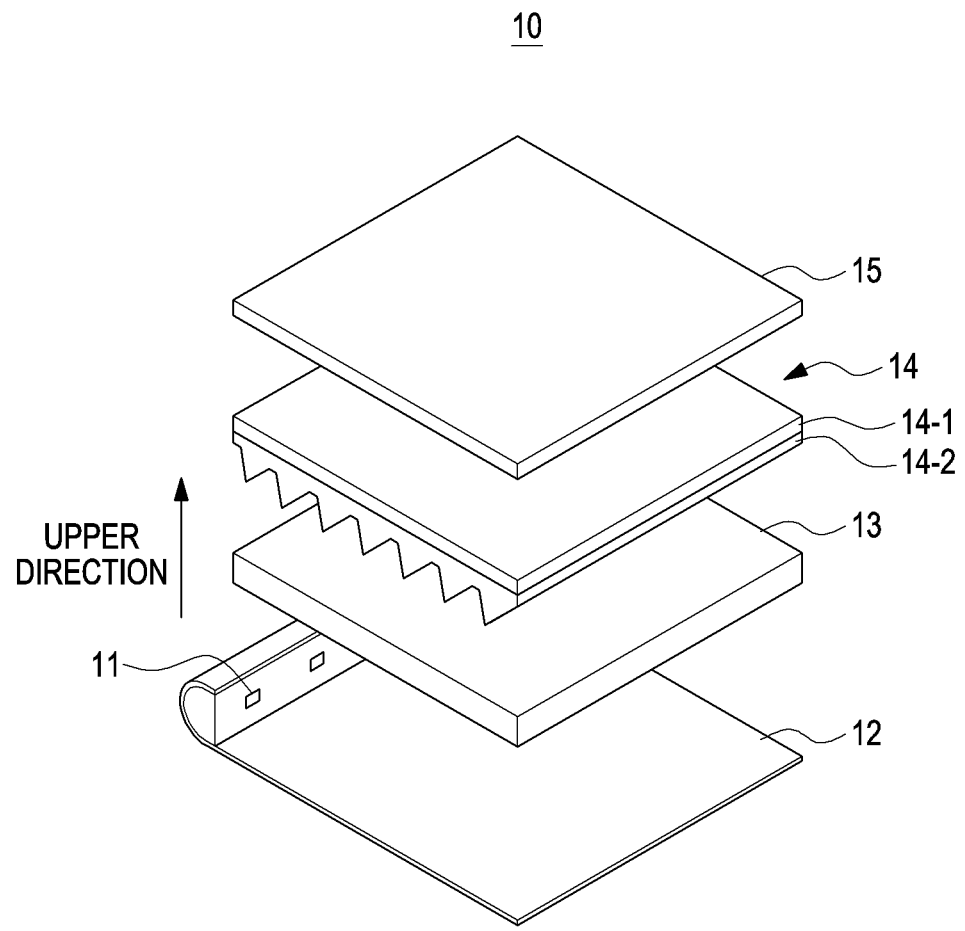
FIG. 1 is a perspective view of a backlight unit according to an embodiment of the present invention.

FIG. 1 is a perspective view of a backlight unit according to an embodiment of the present invention.

In general, a liquid crystal display device includes a backlight unit (10) providing uniform light to the entire screen unlike a conventional cathode ray tube system (CRT). The backlight unit (10) may be provided behind the liquid crystal panel to irradiate light to the liquid crystal panel.

The backlight unit (10) includes a light source (11), a reflective plate (12), a light guide plate (13), a fingerprint recognition optical film ("an optical film") (14) and a reflective polarizing sheet (15).

The light source (11) emits light. The light source (11) may be formed of a light emitting unit that emits light. The light source (11) may emit light from the side of the light guide plate (13) and transmit light to the direction of the light guide plate (13). The light emitted from the light source (11) is irradiated to the rear surface of the liquid crystal panel thereby an identifiable image can be realized.

For example, one of a cold cathode fluorescent lamp (CCFL), an external electrode fluorescent lamp and a light emitting diode (LED) may be used as the light source (11).

The light source (11) is divided into an edge type and a direct type according to the configuration structure and the direct type can be dividedly driven compared to the edge type so that a more detailed image can be realized than the edge type.

The reflector (12) is disposed at the rear of the light guide plate (13) to reflect light emitted from the rear of the light guide plate (13) to the light guide plate (13) to minimize light loss.

The light guide plate (13) converts light incident through the reflector (12) into a surface light source.

The optical film (14) is disposed on the upper portion of the light guide plate (13), condenses the light transmitted from the light guide plate (13) and moves it to the upper portion.

The optical film (14) totally reflects inside the light transmitted from the bottom and then refracts it to the top.

The optical film (14) may include a base film (14-1) and a lens pattern layer (14-2).

The base film (14-1) supports the lens pattern layer (14-2).

For example, the base film (14-1) can be a light transparent film through which the light from the bottom can be easily transmitted. In this case, the base film (14-1) may use, for example, material such as PET, PC and PP.

As another example, the base film (14-1) may be a reflective polarizing sheet (14-1). In this case, the reflective polarizing sheet (14-1) serves to recirculate the light condensed from the plurality of lenses (14-2) by transmitting one polarized light and reflecting the other polarized light downward. For example, a reflective polarizing sheet (14-1) can transmit P-polarized light and reflect S-polarized light.

Here, a reflective polarizing sheet (14-1) is consisted of a plurality of laminated layers with difference in refractive index. For example, the reflective polarizing sheet (14-1) may be configured by stacking tens, hundreds, or thousands of different high and low refractive index layers.

The base film (14-1) may be integrated with the lens pattern layer (14-2). For example, one side of the base film (14-1) and one side of the lens pattern layer (14-2) may be attached by an adhesive. Here, the adhesive may be a pressure sensitive adhesive (PSA).

The lens pattern layer (14-2) condenses the incident light and emits it to the top. The lens pattern layer (14-2) may have a plurality of prisms arranged at a predetermined distance so that infrared rays for fingerprint recognition can be transmitted.

For example, the lens pattern layer (14-2) has an optical pattern in the form of a triangular array (or trigonal prism array) having an inclined surface under the transparent base film (14-1) to improve brightness of emitted light. It may be formed of optical pattern layers arranged at a predetermined distance.

Since the description of the reflective polarizing sheet (15) overlaps with the description of the reflective polarizing sheet 14-1 described above, a detailed description is omitted. When the base film (14-1) is implemented with the reflective polarizing sheet (14-1), the backlight unit (10) may or may not include the reflective polarizing sheet (15).

Of course, the configuration included in the above-described backlight unit (10) is possible in various combinations. For example, the backlight unit (10) may omit some of the light source (11), the reflective plate (12), the light guide plate (13), the optical film (14) and the reflective polarizing sheet (15) or may further include an additional configuration.

For example, the backlight unit (10) may further include a diffuser sheet. Here, the diffuser sheet can uniformly disperse the light incident from the light guide plate (13). The diffuser sheet can cause light diffusion by optical diffusing beads formed by depositing curable resin solution (for example, at least one of urethane acrylate, epoxy acrylate, ester acrylate, and radical-generating monomers, alone or mixed) to which light diffusion agent beads are added. In addition, the diffuser sheet may be formed with a protruded pattern (or protrusion) having a uniform or non-uniform size shape (e.g., a spherical shape) to promote diffusion of the light.

Figure 2:
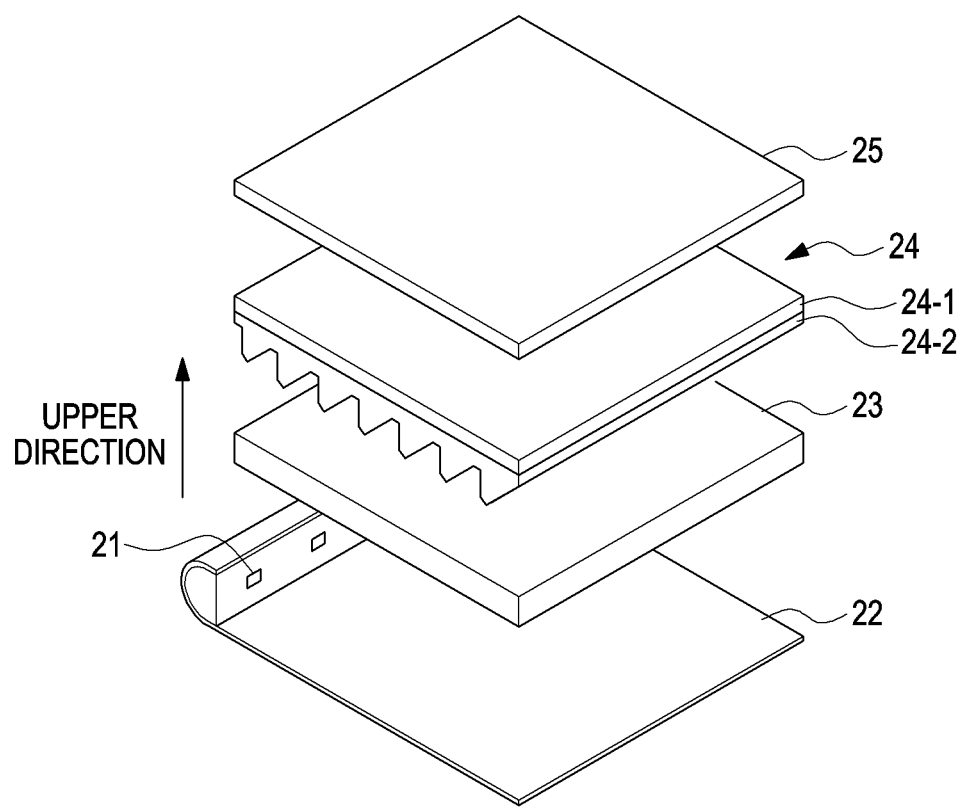
FIG. 2 is a perspective view of a backlight unit according to another embodiment of the present invention.

FIG. 2 is a perspective view of a backlight unit according to another embodiment of the present invention.

Below, in the description of FIG. 2, a detailed description of the configuration overlapping with the contents of FIG. 1 will be omitted.

Referring to FIG. 2, a backlight unit (20) includes a light source (21), a reflector (22), a light guide plate (23), a fingerprint recognition optical film ("an optical film") (24) and a reflective polarizing sheet (25).

The optical film (24) can include a base film (24-1) and a lens pattern layer (24-2).

Here, the lens pattern layer (24-2) is formed as an optical pattern layer including a plurality of lenses having a dual light incident surface and a plurality of lenses are arranged with a predetermined distance.

Although its shape may not be limited, the above-described lens pattern layer (14-2, 24-2) can be formed as a trigonal prism shape as described above or a shape having the dual light incident surface. For example, the above-described lens pattern layer (14-2, 24-2) may be formed to have three or more light incident surfaces or two or more reflection surfaces.

Below, as to the configuration overlapping with the above-described optical films 14 and 24, detailed description may be omitted for the convenience of explanation.

Figure 3:
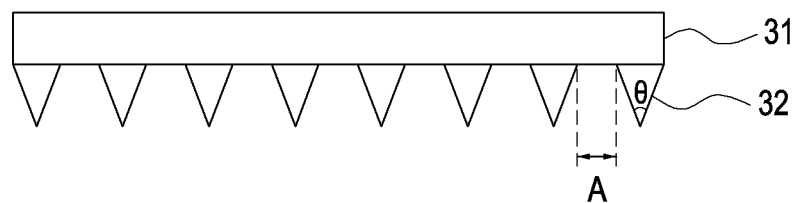
FIG. 3 is a perspective view of an optical film according to an embodiment of the present invention.

FIG. 3 is a perspective view of an optical film according to an embodiment of the present invention.

Referring to FIG. 3, an optical film (30) includes a base film (31) and a lens pattern layer (32).

The base film (31) supports the lens pattern layer (32).

The lens pattern layer (32) is attached to a surface of the base film (31) and condenses light. Specifically, the lens pattern layer (32) can condense the light which was emitted and then transmitted through the light guide plate. For example, a vertex angle (θ) of a plurality of lenses (or a plurality of prism lenses) included in the lens pattern layer (32) can be set to be greater than 0° and less than 90°.

In addition, the lens pattern layer (32) may transmit infrared rays. For example, the lens pattern layer (32) may transmit infrared radiation emitted through an infrared light source. Here, the infrared light source may be provided separately from the light source that emits visible light. As an example, the infrared light source may be included in the optical fingerprint recognition system, which will be described later, to emit infrared rays for fingerprint recognition.

The lens pattern layer (32) may include a plurality of lenses arranged parallel to one another in a predetermined distance (A). Here, the lens pattern layer (32) is arranged where a protrusion direction of a plurality of lenses (32) may be disposed to face the light source and an infrared light source.

For example, if a plurality of lenses above (32) is a prism lens (32), the infrared ray transmission rate is significantly lower because the prism lens (32) is to reflect and refract the infrared. Accordingly, when a flat portion is disposed between the plurality of lenses (32), the infrared ray transmission rate can be increased.

For example, the lens pattern layer (32) can form a flat portion pattern (or line) having a predetermined distance (A) between the plurality of lenses (32) parallelly arranged with each other. Here, the flat portion pattern may be defined as a plurality of flat lines with a predetermined distance as a width.

The flat portion pattern can transmit an infrared ray. As such, it is possible to perform optical fingerprint recognition for a display device adapting the optical film (30) applying the flat portion pattern.

For example, the width of the flat line included in the flat portion pattern may be formed larger than the predetermined distance (A) in the region corresponding to the position of the fingerprint. According to an embodiment of the present invention, in an area corresponding to the fingerprint position, an infrared ray transmission rate for fingerprint recognition is increased through a line pattern formed larger than the width (A) and in an area outside the area corresponding to the fingerprint position, by maintaining the line pattern being the width (A), it is possible to minimize the loss of light luminance and the loss of light condensing efficiency.

In the example described above, a cross-section of the plurality of the lenses included in the lens pattern layer (32) may be one of triangle, rectangle, and pentagon. Here, the triangle is an isosceles triangle, and the rectangle may be an isosceles trapezoid.

Figure 4:
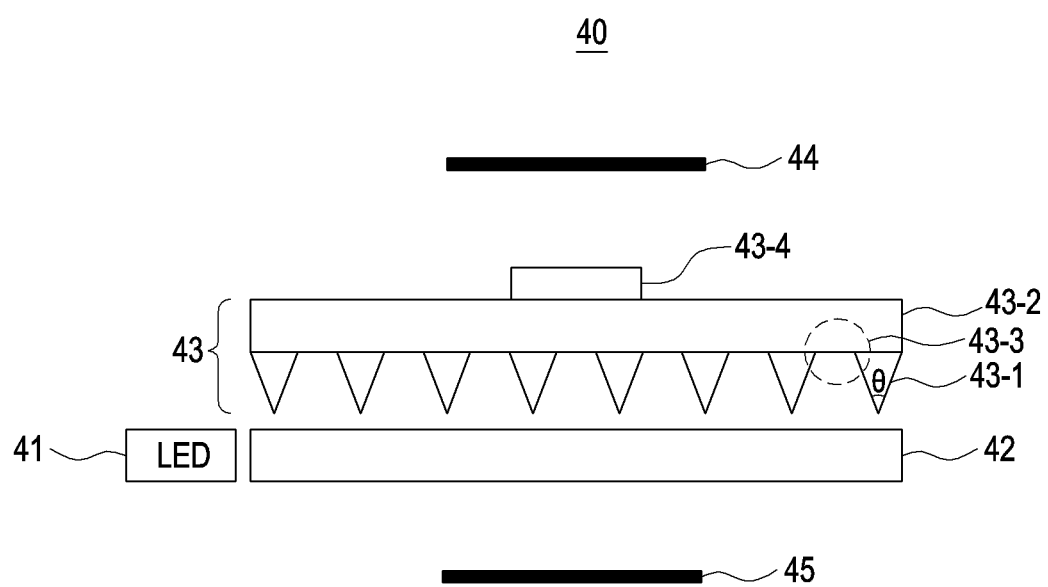
FIG. 4 is a performance test arrangement of the optical film according to an embodiment of the present invention.

FIG. 4 is a performance test arrangement of the optical film according to an embodiment of the present invention.

The performance test of the optical film (43) includes a LED light source (41), a light guide plate (42), an optical film (43), a front detector (44) and a back detector (45). Below, a vertex angle (θ) of a plurality of lenses (43-1) of the optical film (43) is 68° and a refractive index ($n_1$) of the plurality of lenses (43-1) is 1.50, and a thickness of the base film (43-2) is 125 μm and the refractive index ($n_2$) of the base film is 1.62 (if the base film (43-2) is a reflective polarizing sheet, the refractive index ($n_2$) is 1.6), and the lens spacing (43-3) is defined as one of 0 μm, 2 μm, 4 μm, and 6 μm. In addition, for the measurement, the optical film (43) was used in a size of 5×5 mm.

The front detector (44) detects light emitted from the LED light source (41) and then condensed by the optical film (43). The light detection of the front detector (44) is performed without the placement of the fingerprints (43-4).

The back detector (45) detects the light reflected by the fingerprint (43-4).

The experimental results of the above-described performance test for the optical film (43) will be described in detail with reference to FIGS. 5 and 6 below.

Figure 5:
FIG. 5 shows the results of the performance test of the prism sheet according to an embodiment of the present invention.
Figure 5:
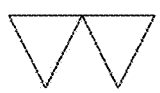
Figure 5:
Figure 5:
Figure 5:
Figure 5:
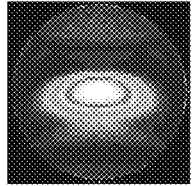
Figure 5:
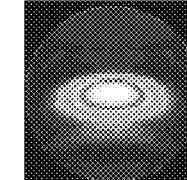
Figure 5:
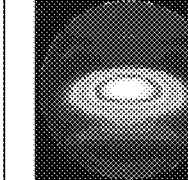

FIG. 5 discloses the center gain of the light detected by the front detector (44) and the rear detector (45). In the front detector (44), it is possible to confirm a change in luminance of light transmitted to the upper part with respect to the distance of the flat portion pattern (43-3). In the rear detector (45), it is possible to check the change in luminance of light reflected by the fingerprint (43-4) with respect to the width of the flat portion pattern (43-3) and then transmitted to the lower portion.

Specifically, referring to FIG. 5, Experiment 1 (51) is for a case where a width of a line pattern (43-3) is set to 0 μm, and it is defined as a reference experiment. In Experiment 1

(51), the center gain of the front detector (44) and the rear detector (45) is defined as 100%. Here, it can be confirmed that light is barely detected in the rear detector (45).

Experiment 2 (52) is for a case where a width of the flat portion pattern (43-3) is set to 2 μm. In Experiment 2 (52), as compared to Experiment 1 (51), the center gain of the front detector (44) was somewhat reduced to 99%, but the center gain of the rear detector (44) was significantly improved to 271%.

Experiment 3 (53) is a case where a width of the flat portion pattern (43-3) is set to 4 μm. In Experiment 3 (53), as compared to Experiment 1 (51), the center gain of the front detector (44) was somewhat reduced to 98%, but the center gain of the rear detector (45) was significantly improved to 365%.

Experiment 4 (54) is a case where a width of the flat portion pattern (43-3) is set to 6 μm. In Experiment 4 (54), as compared to Experiment 1 (51), the center gain of the front detector (44) was somewhat reduced to 98%, but the center gain of the rear detector (44) was significantly improved to 456%.

Referring to the above-described Experiment 1 (51) to the Experiment 4, when the width of the lens pattern (43-3) is increased, it can be confirmed that the light detection rate for the light reflected from the fingerprint (43-4) and then transmitting through the optical film (43) is significantly improved although the brightness of light transmitting to the upper portion of the optical film (43) is very slightly reduced.

As a result, the fingerprint recognition rate is significantly improved when the width of the flat portion pattern (43-3) is reserved and thereby fingerprint recognition errors can be greatly reduced. The optical film (43) according to one embodiment of the present invention may be offered to be adopted to an optical fingerprint recognition system for a small display device such as a smartphone.

Figure 6:
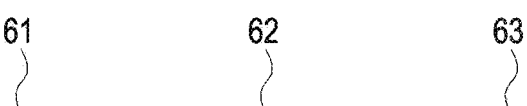
FIG. 6 shows the results of the performance test of the prism sheet according to another embodiment of the present invention.
Figure 6:
Figure 6:

FIG. 6 discloses the center gain of the light detected by the front detector (44). Here, the experimental condition for the FIG. 6 is the same condition as the experiment of FIG. 5. The experiment results for FIG. 6 include the center gain when the width of the flat portion pattern (43-3) is 6 μm, 9 μm and 12 μm.

Experiment 1 (61) is for the width of the flat portion pattern to be set to 6 μm, and the center gain is defined as 100%.

Experiment 2 (62) is a case when the width of the flat portion pattern (43-3) is set to 9 μm. For the case of Experiment 2 (62), the center gain of the front of the detector (44) is 54.7% and it is significantly reduced compared to the center gain of 100% measured at Experiment 1 (61).

Experiment 3 (63) is a case when the width of the flat portion pattern (43-3) is set to 12 μm. For the case of Experiment 3 (63), the center gain of the front of the detector (44) is 17.3% and it is significantly reduced compared to the center gain of 100% measured at Experiment 1 (61).

Referring to the above-described Experiment 1 (61) to Experiment 3 (63), it can be seen that the light condensing performance for the optical film (43) is significantly reduced because of rapid decreasing of the center gain or the center brightness when the width of the flat portion pattern (43-3) exceeds 6 μm. According to these experimental results, the optical film (43) can be used for a light condensing sheet when the width of the flat portion pattern (43-3) should be formed to be under 6 μm. It is impossible for the optical film (43) to be used for the light condensing sheet if the width of the flat portion pattern (43-3) exceeds 6 μm.

Meanwhile, the shape of the optical films (30, 43) is not limited to the above-described embodiment. For example, a plurality of lenses (32, 43-1) included in the optical film (30, 43) may form a plurality of the light incident surfaces. In this regard, another embodiment of the optical films (30, 43) will be described in detail below with reference to FIG. 7.

Figure 7:
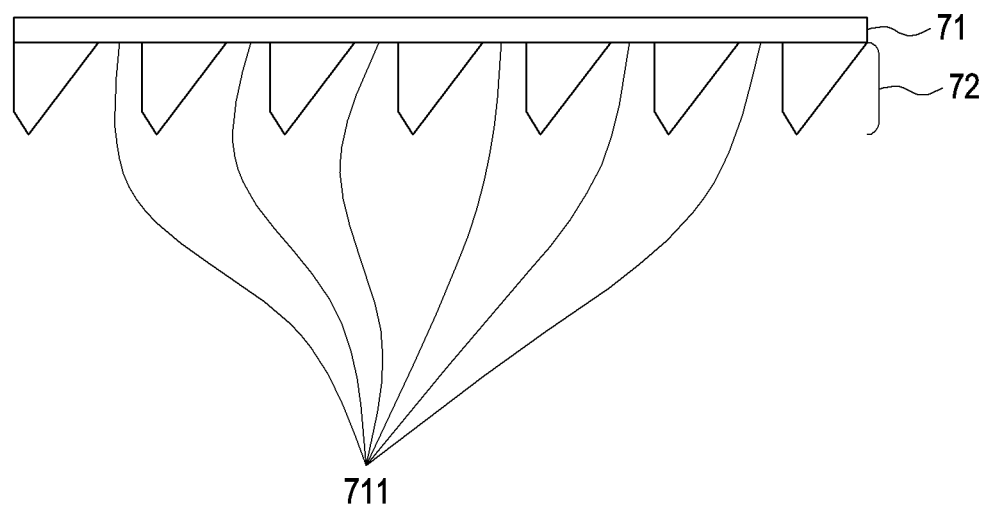
FIG. 7 is a cross-sectional view of an optical film according to another embodiment of the present invention.

FIG. 7 is a cross-sectional view of an optical film according to another embodiment of the present invention.

Referring to FIG. 7, a fingerprint recognition optical film ("an optical film") (70) may include a base film (71) and a lens pattern layer (72).

The base film (71) supports the lens pattern layer (72). For one example, one surface of the base film (71) and one side of the lens pattern layer (72) may be attached by an adhesive.

In addition, the base film (71) may transmit a various frequency band of light including an infrared ray.

The lens pattern layer (72) is attached to one surface of the base film (71) and it can condense light. Here, the lens pattern layer (72) may include a plurality of lenses (72).

For one example, a flat portion (711) can be formed between the plurality of lenses (72). More specifically, the flat portion (711) can be formed on the base film (71) between the adjacent lenses (72).

Figures 8, 9:
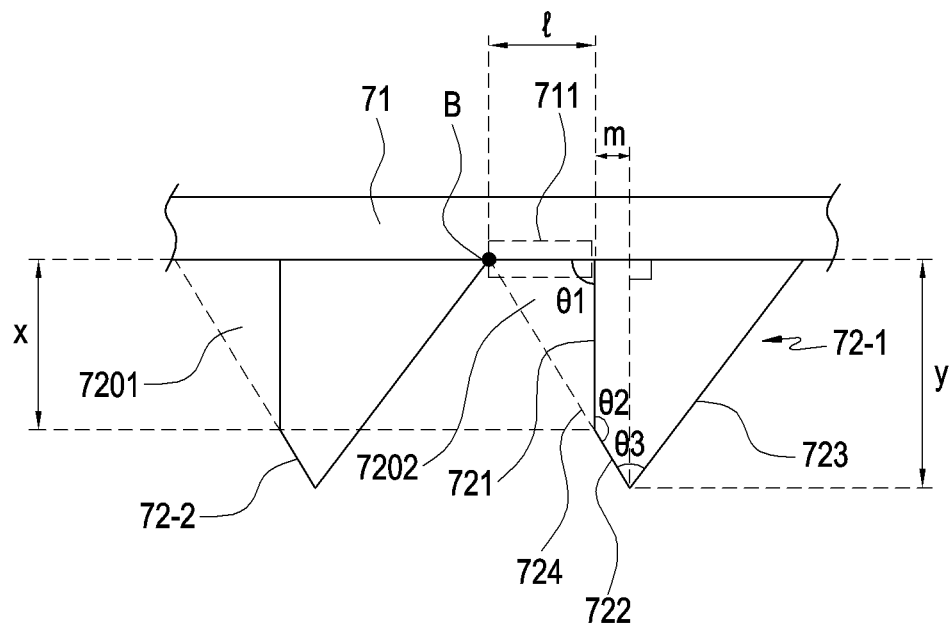
FIG. 8 discloses an enlarged cross-sectional view of the plurality of lenses according to one embodiment of the present of invention.
FIG. 9 discloses a specification of a plurality of lenses according to an embodiment of the present invention.
Figure 10:
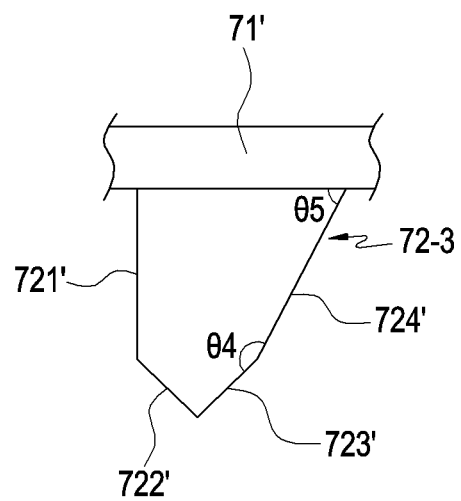
FIG. 10 discloses an enlarged cross-sectional view of one lens of a plurality of lenses according to another embodiment of the present invention.

For one example, the plurality of lenses (72) can be formed as a group of pillar shape lenses including a plurality of surfaces. The plurality of lenses (72) can be variously formed. Referring to FIG. 8 to FIG. 10, an exemplary cross-section of one of the plurality of lenses (72) will be described in detail.

Below, even though one of the plurality of lenses (72) will be described, this can be applied similarly to all or at least some lenses included in the plurality of lenses (72) without any limitation.

FIG. 8 discloses an enlarged cross-sectional view of the plurality of lenses according to one embodiment of the present of invention.

Referring to FIG. 8, one lens (72-1) can include a flat portion (711) formed between the two different lenses (72-1, 72-2) adjacent each other on the base film (71) and a first light incident surface (721) forming a predetermined first angle ($\theta_1$). For example, the predetermined first angle ($\theta_1$) may be a right angle (90°).

In addition, the one lens (72-1) may include a second light incident surface (722) forming a predetermined second angle ($\theta_2$) with the first light incident surface (721).

For example, the predetermined second angle ($\theta_2$) can be formed to be larger than 90° and smaller than 180°.

Below, referring to FIG. 9, various embodiments for the plurality of lenses (72) will be described in detail.

In FIG. 9, a length of the flat portion formed between the two different lenses (72-1, 72-2) adjacent each other on the base film (71) is defined as "$\ell$." A shortest distance between a vertical line drawn from a vertex of the one lens (72-1) to the base film (71) and the first light incident surface (721) is defined as "m." A length of a vertical line drawn from a point on a tangential line between the first (721) and the second (722) light incident surface to the base film (71) is defined as "x." A length of a vertical line drawn from the vertex of the one lens (72-1) to the base film (71) is defined as "y."

In addition, if $\ell$ is 7 μm and m is 2.3 μm, a ratio between $\ell$ and m is 3.04:1, and in this case, x is 8.3, y is 11.9 and a ratio between x and y is 0.7:1.

In addition, if $\ell$ is 8 μm and m is 1.3 μm, a ratio between $\ell$ and m is 6.15:1, and in this case, x is 6.7, y is 11.9 and a ratio between x and y is 0.56:1.

From the example described above, if the length $\ell$ of the flat portion (711) for the plurality of lenses (72) is less than 6 µm, it may be improper to use for the fingerprint recognition system because the fingerprint recognition rate for the optical film (70) is short of a certain level (for example, infrared transmission rate of 30%). In addition, if the length ℓ of the flat portion (711) for the plurality of lenses (72) exceeds 8 µm, it may be improper to use for the fingerprint recognition system because the light condensing efficiency and brightness of the plurality of lenses (72) is significantly reduced since a size of the second light incident surface (722) is excessively shrunk.

In addition, in a performance test as to the above-mentioned examples, among the cases where ℓ is 6 µm, 7 µm and 8 µm, the optical film (70) applying the plurality of lenses having ℓ of 7 µm shows the best performance in the fingerprint recognition rate and the light condensing efficiency.

According to one embodiment of the present invention, one lens (72-1) of a plurality of lenses (72) may further include a first reflective surface (73) forming a predetermined third angle ($\theta_3$) with the second light incident surface (722).

In this case, the first light incident surface (721) and the second light incident surface (722) can be defined as a surface where light transmitted from a light guide plate (23) incidents and the first reflective surface (73) can be defined as a surface where light which incidents to the first (721) and the second (722) light incident surfaces is totally reflected.

Since an infrared ray can easily transmit through the flat portion (711), it is possible to maximize the fingerprint recognition rate for the optical fingerprint recognition system.

Referring a manufacturing method for one lens (72-1) of the plurality of lenses (72) as an example, firstly, the plurality of lenses having a cross-section of a triangle is consecutively formed on the base film (71). (Referring a dotted line 724 in FIG. 8). Next, they can be formed by deleting a portion (7201, 7202) of the plurality of lenses. Through this, the flat portion (711) can be retained between the one lens (72-1) and the other lens (72-2) of the plurality of lenses (72).

In the example described above, the one lens (72-1) and the other lens (72-2) of the plurality of lenses (72) can be disposed consecutively on the base film (71). In this case, the other lens (72-1) of the plurality of lenses (72) is disposed to a cross point (B) where the base film (71) intersects with a virtual surface (724) extended from the second light incident surface (722) of the one lens (72-1) of the plurality of lenses (72).

According to one embodiment in FIG. 8, the infrared ray transmission for the optical fingerprint recognition can be smooth by forming the flat portion (711) on the base film (71) where the plurality of lenses (72) is disposed.

FIG. 10 discloses an enlarged cross-sectional view of one lens of a plurality of lenses according to another embodiment of the present invention.

In the following, the overlapping description with FIG. 8 will be omitted.

Referring to FIG. 10, one lens (72-3) of a plurality of lenses (72) may further include a second reflective surface (724) forming a fourth angle ($\theta_4$) with the first reflective surface (723') of the one lens (72-3) and forming a fifth angle ($\theta_5$) with the base film (71'). Here, the one lens (72-3) of the plurality of lenses (72) can be formed to include a variety of structures such as an inside recessed structure, a curved structure (concave or convex) or their combination structures unlike disclosed in the drawings.

In FIG. 10, numbers of the light incident surfaces (721', 722') and the reflective surfaces (722', 724') for the one lens (72-3) of the plurality of lenses are not limited and thus additional surfaces can be formed.

In FIG. 8 stated above, the number of surfaces for the light incident surfaces (721, 722) and the reflective surface (723) of the one lens (72-1) of the plurality of lenses is 3 and thereby the degree of freedom is defined to be 3. Since this is larger than the degree of freedom of 2 that is generally necessary for the light condensing, the light condensing performance can be largely improved.

Moreover, in the above-described FIG. 10, the number of surfaces for the light incident surfaces (721', 722') and the reflective surfaces (723', 724') of the one lens (72-3) of the plurality of lenses is 4 and thereby the degree of freedom is defined to be 4. Since this is larger than the degree of freedom of 3 for the one lens (72-1) in FIG. 8, the light condensing performance of the one lens (72-3) in FIG. 10 can be more largely improved than the light condensing performance of the one lens (72-1) in FIG. 8.

According to the embodiments described in FIG. 8 to FIG. 10, the brightness of light transmitting the optical film (70) for fingerprint recognition according to various embodiments of the present invention can be largely improved.

Figure 11:
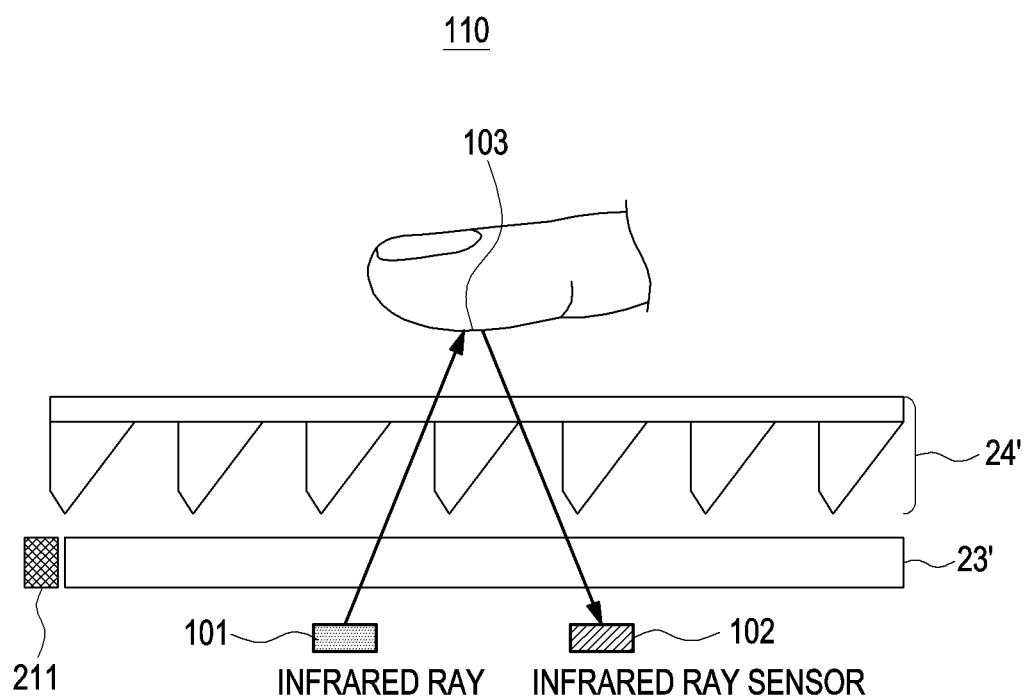
FIG. 11 is a schematic view of an optical fingerprint recognition system according to one embodiment of the present invention.

FIG. 11 is a schematic view of an optical fingerprint recognition system according to one embodiment of the present invention.

Referring to FIG. 11, an optical fingerprint recognition system (110) may include an infrared ray source (101), an infrared ray sensor (102), a light source (21'), a light guide plate (23') and a fingerprint recognition optical film (24').

Light emitted from the light source (21') traverses through the light guide plate (23') to an upper portion to display an image in a liquid crystal panel. Here, the fingerprint recognition optical film (24') can condense the light and move it to the upper portion.

An infrared ray for fingerprint recognition is emitted from the infrared ray source (101) and thus it can transmit the fingerprint recognition optical film (24'). The transmitted infrared ray is reflected by a fingerprint (103) and then it can transmit the fingerprint recognition optical film (24') again. The transmitted infrared ray for the second time can be accepted by the infrared ray sensor (102) and a fingerprint image can be recognized by the accepted infrared ray.

Here, the fingerprint recognition optical film (24') can be the fingerprint recognition optical film (70) described as an example in FIG. 7. The results for the performance test as to such optical films for fingerprint recognition (70, 24') are described in detail referring to FIG. 12.

FIG. 12 discloses the results of the performance test as to the fingerprint recognition optical film according to one embodiment of the present invention.

Figure 13:
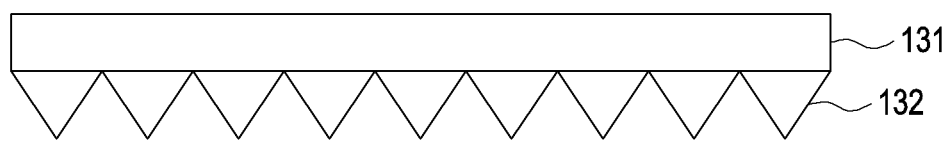
FIG. 13 is a cross-sectional view of a fingerprint recognition optical film according to a conventional technology.
Figure 14:
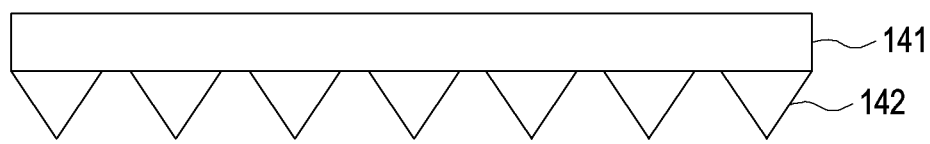
FIG. 14 is a cross-sectional view of a fingerprint recognition optical film according to yet another embodiment of the present invention.

Referring to FIG. 12, the first experiment (121) was performed with respect to a first structure of the optical film (130) in FIG. 13, the second experiment (122) was performed with respect to a second structure of the optical film (70) in FIG. 7, and the third experiment (123) was performed with respect to a third structure of the optical film (140) in FIG. 14.

The first structure of the optical film (130) may comprise a plurality of prisms (132) disposed on a base film (131). In this case, a flat portion such as the flat portion (711) in FIG. 7 and the flat portion (211) in FIG. 8 is omitted since the plurality of prisms (132) are disposed closely contacting each other.

The overlapped description as to the second structure of the optical film (70) will be omitted since it is described in FIG. 7 and FIG. 8 in detail.

The third structure of the optical film (140) is shown in FIG. 14. The third structure of the optical film (140) may comprise a plurality of prisms (142) disposed on a base film (141). In this case, a flat portion can be formed since the plurality of prisms (142) is disposed with a predetermined distance.

Referring to FIG. 12, a width of one prism of the plurality of prisms (132) in the first experiment (121) is 18 µm. A width of the flat portion between the plurality of prisms (132) is 0 µm. In another words, the flat portion between the plurality of prisms (132) is omitted. In this case, the center brightness is 100% and the full width half maximum (FWHM) is 20°/81° for up-down/left-right.

A width of one prism of the plurality of prisms (72) is 11 µm and a width of the flat portion is 7 µm in the second experiment (122). In this case, the center brightness is 111% and the full width half maximum (FWHM) is 16°/71° for up-down/left-right.

A width of one prism of the plurality of prisms (142) is 11 µm and a width of the flat portion is 7 µm in the third experiment (123). In this case, the center brightness is 82% and the full width half maximum (FWHM) is 24°/69° for up-down/left-right.

When the results of the first (121) to the third (123) experiment are reviewed, the full width half maximum (FWHM) for up-down/left-right of the second experiment tends to show smaller than that of the first and the third experiment. This is because the first structure (130) and the third structure (140) of the optical films dispose the plurality of prisms (132, 142) unlike the plurality of lenses (72) for the second structure of the optical film (70). In another words, since the degree of freedom for the plurality of prisms (132, 142) disposed in the first (130) and the third (140) structure of the optical films is smaller (Degree of Freedom=2) than the degree of freedom for the plurality of lenses (72) disposed in the second structure of the optical film (70) (Degree of Freedom=3), the light condensing performance of the second structure of the optical film (70) can be relatively superior.

Accordingly, the center brightness (111%) for the second experiment (122) can be more largely improved than the center brightness (100%) for the first experiment (121) and the center brightness (82%) for the third experiment (123).

Figure 15:
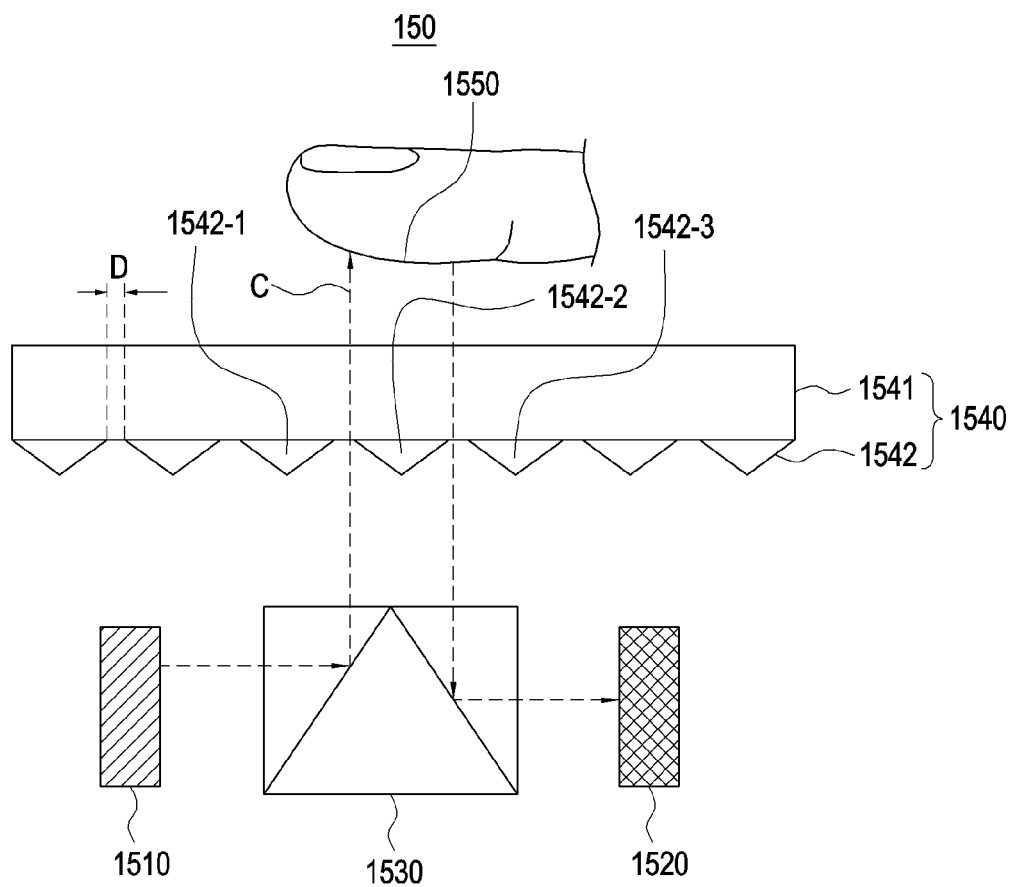
FIG. 15 discloses an optical fingerprint recognition system according to one embodiment of the present invention.

FIG. 15 discloses an optical fingerprint recognition system according to one embodiment of the present invention.

Referring to FIG. 15, an optical fingerprint recognition system (150) may comprise an infrared ray source (1510), an image sensor (1520), a reflective device (1530), and an optical film (1540).

The infrared ray source (1510) may emit infrared LED light. For example, the infrared ray source (1510) may irradiate infrared light having a wavelength of 750 nm or more. Since the infrared ray is relatively long wavelength, light loss is small and diffuse reflection is small, so that a clear image can be obtained from the image sensor (1520).

The image sensor (1520) senses a fingerprint image. The image sensor (1520) converts the infrared ray reflected by the fingerprint into electrical signals and stores them. For example, the image sensor (1520) may be a charge coupled device (CCD) or a complementary metal-oxide semiconductor (CMOS).

A reflective device (1530) may be refracted the infrared ray. For example, the reflective device (1530) may refract the infrared ray emitted from the infrared ray source (1510) or refract the infrared ray reflected by the fingerprint. For example, the reflective device (1530) may include various applications that refract the direction of light, such as at least one prism or a beam splitter.

Here, the reflective device (1530) may be formed under the reflector (12) described in FIG. 1. In addition, it may be formed of material that transmits visible light and may be formed on the reflector (12).

An optical film (1540) has a base film (1541) and a lens pattern layer (1542). Here, the plurality of lenses included in the lens pattern layer (1542) may be prism lenses.

The lens pattern layer (1542) may be disposed to facing the infrared ray source (1510). Specifically, the lens pattern layer (1542) may be disposed in a direction C where the infrared ray is incident to the lens pattern layer (1542). In this case, the arrangement direction of the lens pattern layer (1542) may be defined as a reverse arrangement.

A plurality of lenses included in the lens pattern layer (1542) lenses are parallelly arranged with a predetermined distance (D). Here, the predetermined distance (D) may be defined as a width of a flat portion pattern.

For example, the width of the flat portion pattern (D) may be predetermined to 2 µm, 4 µm, and 6 µm, etc. Or, the width of the flat portion pattern (D) may be defined as 6 µm or less. Or, the width of the flat portion pattern (D) may be defined as 2 µm or more and 6 µm or less.

For example, vertex angles of the plurality of lenses may be greater than 0° and less than 90°. Here, the plurality of prisms may be formed in a polygon. For example, the plurality of prisms may be formed as triangles or isosceles triangles.

For example, among the plurality of prisms, a distance between a plurality of third prisms (1542-1, 1542-2, 1542-3) corresponding to a fingerprint position (1550) may be set to be greater than the width (D) of the flat portion pattern. Through this, the infrared ray transmission rate with respect to a region of the optical film (1540) corresponding to the fingerprint position (1550) can be relatively improved against the transmission rate with respect to a region of the optical film (1540) corresponding out of the fingerprint position (1550).

Below, detailed description for overlapping content as to a configuration of the optical fingerprint recognition system described in FIG. 15 will be omitted for the convenience of explanation.

Figure 16:
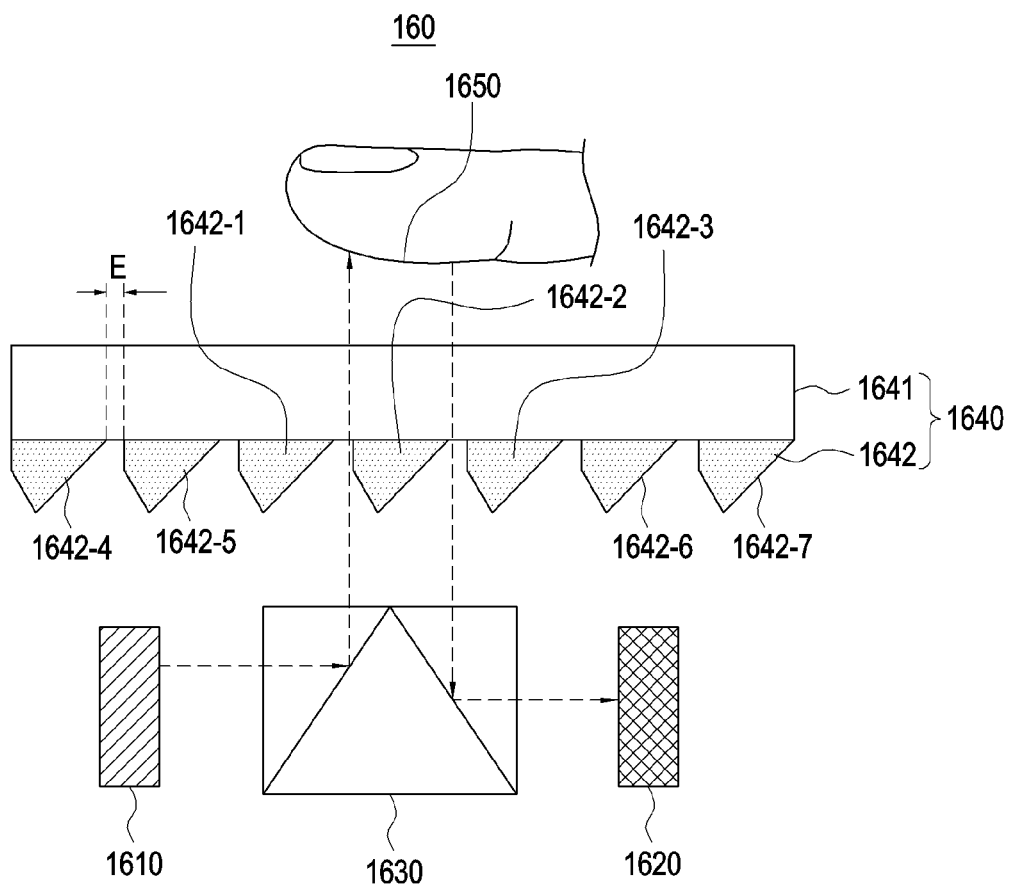
FIG. 16 discloses an optical fingerprint recognition system according to another embodiment of the present invention.

FIG. 16 discloses an optical fingerprint recognition system according to another embodiment of the present invention.

Referring to FIG. 16, an optical fingerprint recognition system (160) may comprise an infrared ray source (1610), an image sensor or an infrared sensor (1620), a reflective device (1630) and a fingerprint recognition optical film (1640).

The optical film for fingerprint (1640) may include a base film (1641) and a lens pattern layer (1642).

A plurality of lenses (1642) included in the lens pattern layer (1642) may be parallelly arranged with a predetermined distance (E). Here, the predetermined distance (E) may be defined as a width of a flat portion pattern (E).

For example, at least one of a plurality of lenses (1642) may include an infrared absorbent. In this case, at least one of the plurality of lenses (1642) may be formed of acryl resin containing an infrared absorbent.

For example, the amount of the infrared absorbent included in the plurality of lenses (1642) may exceed the amount of the infrared absorbent included in at least one lens of the plurality of lenses (1642). Specifically, the amount of the infrared absorbent included in at least one lens (1642-1, 1642-2, 1642-3) corresponding to a fingerprint position (1650) among the plurality of lenses (1642) may exceed the amount of the infrared absorbent included in at least one lens (1642-4, 1642-5, 1642-6, 1642-7) corresponding out of the fingerprint position (1650) among the plurality of lenses (1642). Through this, the infrared transmission rate with respect to a region of the optical film (1640) corresponding to the fingerprint position (1650) can be relatively improved against the infrared transmission rate with respect to a region of the optical film corresponding out of the fingerprint position (1650).

In addition, a plurality of lenses (1642-4, 1642-5, 1642-6, 1642-7) corresponding to an area out of the fingerprint position (1650) among the plurality of lenses (1642) may not include the infrared absorbent. In another words, only the plurality of lenses (1642-1, 1642-2, 1642-3) corresponding to the fingerprint position (1650) may include the infrared absorbent. Through this, brightness deterioration can be minimized.

Below, detailed description for overlapping content as to a configuration of the optical fingerprint recognition system described in FIG. 16 will be omitted for the convenience of explanation.

Figure 17:
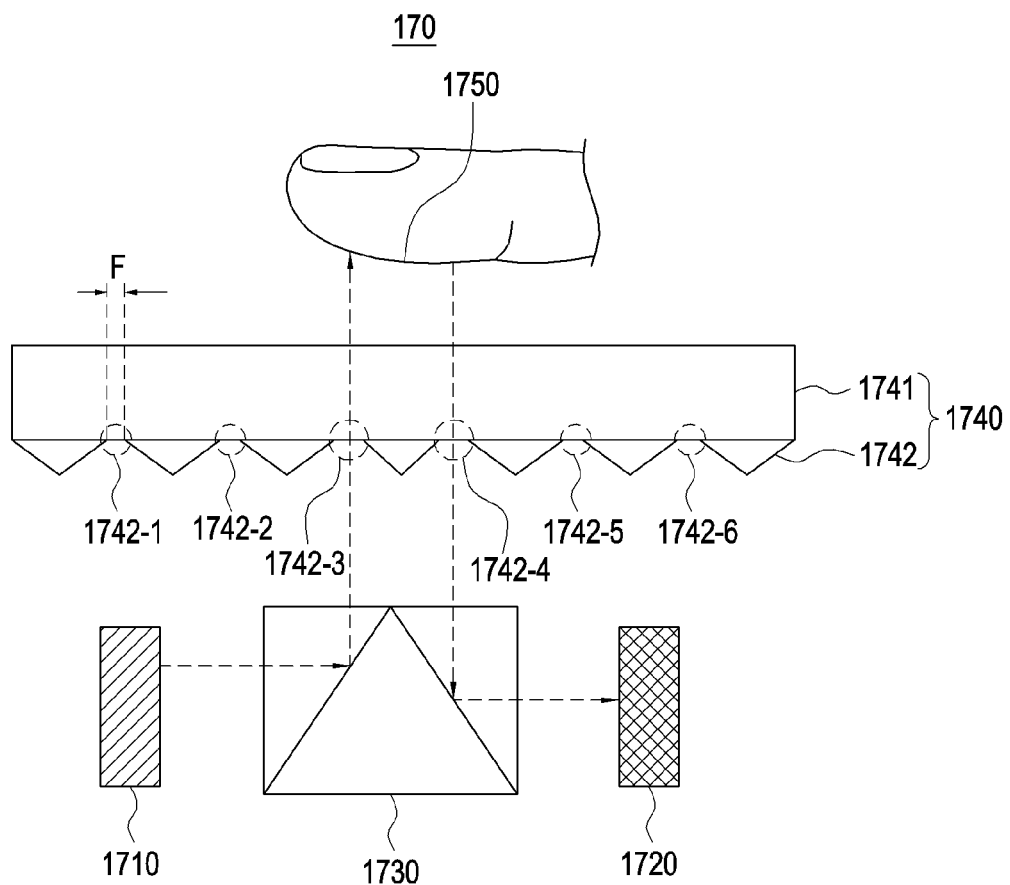
FIG. 17 discloses an optical fingerprint recognition system according to yet another embodiment of the present invention.

FIG. 17 discloses an optical fingerprint recognition system according to yet another embodiment of the present invention.

Referring to FIG. 17, an optical fingerprint recognition system (170) may comprise an infrared ray source (1710), an image sensor (1720), a reflective device (1730) and an optical film (1740).

The optical film (1740) may include a base film (1741) and a lens pattern layer (1742). Here, a plurality of lenses included in the lens pattern layer (1742) may be prism lenses.

For example, the lens pattern layer (1742) may be parallelly arranged with a predetermined distance (F). Here, the predetermined distance (F) may be defined as a width of a flat portion pattern (F).

As an example, among the flat portion patterns (1742-1, 1742-2, 1742-3, 1742-4, 1742-5, 1742-6), the width of the flat portion pattern (1742-3, 1742-4) corresponding to a fingerprint position (1750) can be different to the width of the flat portion pattern (1742-1, 1742-2, 1742-5, 1742-6) corresponding out of the fingerprint position (1750).

For instance, the width of the flat portion pattern (1742-1, 1742-2, 1742-5, 1742-6) corresponding to an area out of the fingerprint position (1750) can be formed with F. In this case, the width of the flat portion pattern (1742-3, 1742-4) corresponding to the fingerprint position (1750) can be formed with a larger distance than F.

According to the above-described embodiment of the present invention, among the flat portion patterns (1742-1, 1742-2, 1742-3, 1742-4, 1742-5, 1742-6), by forming the width of the flat portion pattern (1742-3, 1742-4) corresponding to a fingerprint position (1750) to be larger than the width of the flat portion pattern (1742-1, 1742-2, 1742-5, 1742-6) corresponding to an area out of the fingerprint position (1750), it is possible to increase the infrared transmission rate with respect to a region of the optical film (1740) corresponding to the fingerprint position (1750) and to minimize the light condensing performance and the brightness deterioration with respect to a region of the optical film (1740) corresponding to an area out of the fingerprint position (1750).

Figure 18:
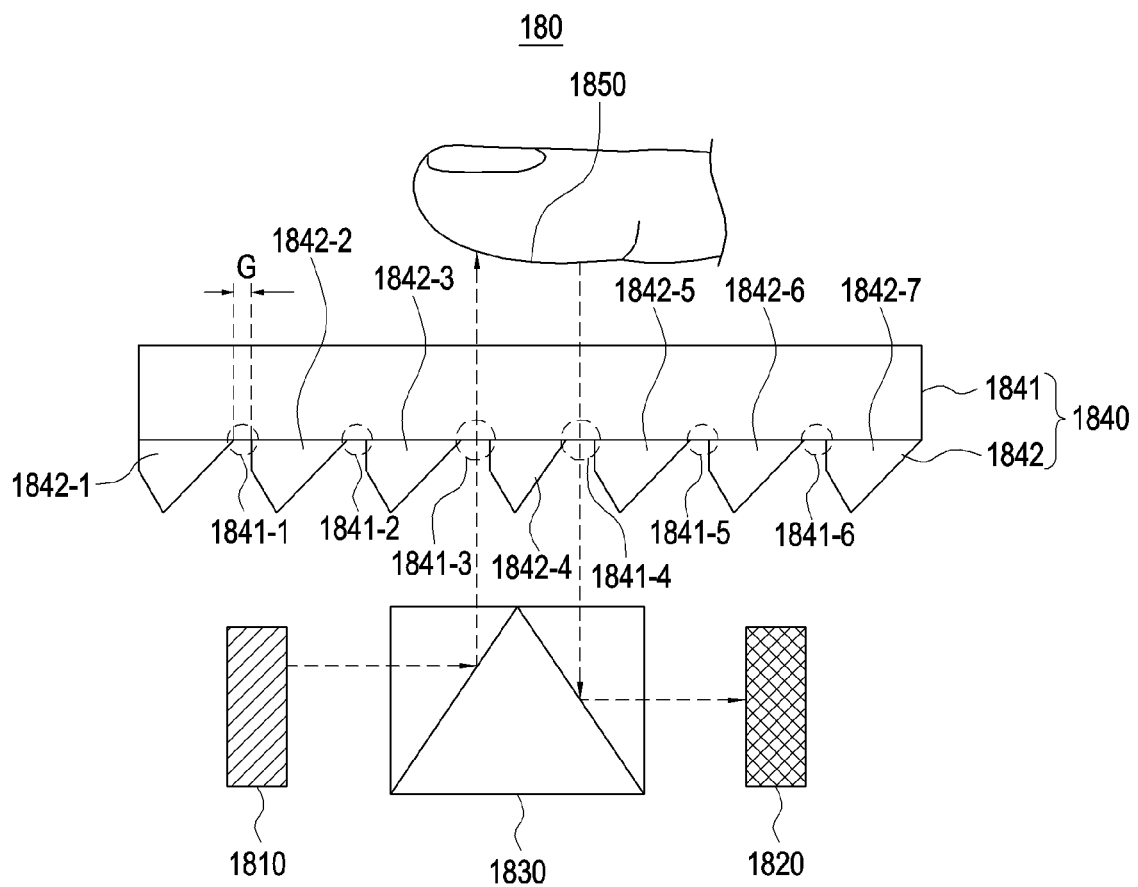
FIG. 18 discloses an optical fingerprint recognition system according to still another embodiment of the present invention.

FIG. 18 discloses an optical fingerprint recognition system according to still another embodiment of the present invention.

Referring to FIG. 18, an optical fingerprint recognition system (180) may comprise an infrared ray source (1810), an image sensor (1820), a reflective device (1830) and an optical film (1840).

The optical film (1840) may include a base film (1841) and a lens pattern layer (1842).

For example, the lens pattern layer (1842) may be parallelly arranged with a predetermined distance (G). Here, the predetermined distance (G) may be defined as a width of a flat portion pattern (G).

As an example, among the flat portion patterns (1841-1, 1841-2, 1841-3, 1841-4, 1841-5, 1841-6), the width of the flat portion pattern (1841-3, 1841-4) corresponding to a fingerprint position (1850) can be different to the width of the flat portion pattern (1841-1, 1841-2, 1841-5, 1841-6) corresponding out of the fingerprint position (1850).

For instance, the width of the flat portion pattern (1841-1, 1841-2, 1841-5, 1841-6) corresponding to an area out of the fingerprint position (1850) can be formed with G. In this case, the width of the flat portion pattern (1841-3, 1841-4) corresponding to the fingerprint position (1750) can be formed with a larger distance than G.

According to the above-described embodiment of the present invention, among the flat portion patterns (1841-1, 1841-2, 1841-3, 1841-4, 1841-5, 1841-6), by forming the width of the flat portion pattern (1841-3, 1841-4) corresponding to a fingerprint position (1850) to be larger than the width of the flat portion pattern (1841-1, 1841-2, 1841-5, 1841-6) corresponding to an area out of the fingerprint position (1850), it is possible to increase the infrared transmission rate with respect to a region of the optical film (1840) corresponding to the fingerprint position (1850) and to minimize the light condensing performance and the brightness deterioration with respect to a region of the optical film (1840) corresponding out of the fingerprint position (1850).

Moreover, it is possible to form the width of the flat portion pattern (1841-3, 1841-4) corresponding to a fingerprint position (1850) to be larger than the width of the flat portion pattern (1841-1, 1841-2, 1841-5, 1841-6) corresponding to an area out of the fingerprint position (1850) and, at the same time, it is also possible for the amount of the infrared absorbent included in at least one lens (1842-3, 1842-4, 1842-5) corresponding to a fingerprint position (1850) among the plurality of lenses (1842) to exceed the amount of the infrared absorbent included in at least one lens (1842-1, 1842-2, 1842-6, 1842-7) corresponding to an area out of the fingerprint position (1850) among the plurality of lenses (1842).

In addition, the flat portion pattern may not be formed at a region out of the fingerprint position for the fingerprint recognition optical film (1840). In other words, the flat portion pattern may be formed only at a region corresponding to the fingerprint position (1850) for the fingerprint recognition optical film (1840). Accordingly, deterioration of the full width half maximum (FWHM) can be minimized in the lens pattern layer (1842).

Figure 19:
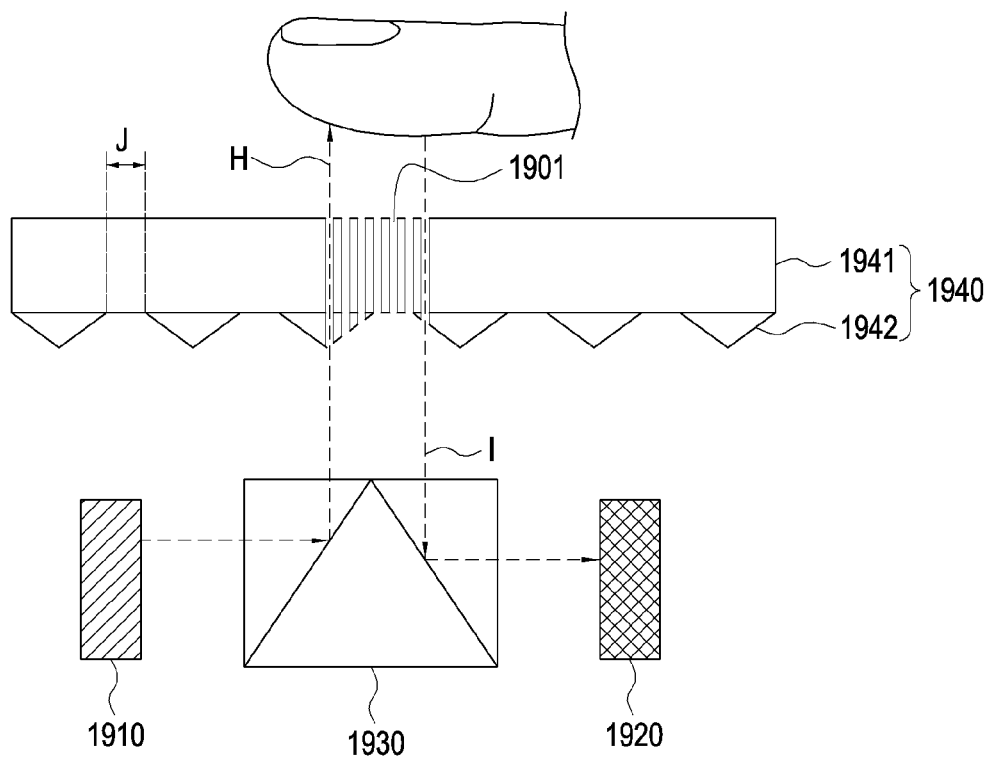
FIG. 19 discloses an optical fingerprint recognition system according to still another embodiment of the present invention.

FIG. 19 discloses an optical fingerprint recognition system according to still another embodiment of the present invention.

Referring to FIG. 19, an optical fingerprint recognition system (190) may comprise an infrared ray source (1910), an image sensor (1920), a reflective device (1930) and an optical film (1940).

The optical film (1940) may include a base film (1941) and a lens pattern layer (1942).

For example, the optical film (1940) may include a plurality of through holes (1901). Here, the plurality of through holes (1901) may be formed in a traveling direction (H or I) of an infrared ray to transmit the infrared ray. Accordingly, the infrared ray can transmit (or pass) the base film (1941) and the lens pattern layer (1942) at the same time. Here, the plurality of through holes (1901) may be disposed at a predetermined distance. In this case, the longest distance between the two selected from the plurality of through holes (1901) may be set to 10 mm. In addition, the distance between the two selected from the plurality of through holes (1901) may be variously set to less than 10 mm to 10 mm or more.

According to FIG. 19, the optical film (1940) can effectively transmit the infrared ray through the planar line of the lens pattern layer (1942) retained with the predetermined distance J and the plurality of through holes (1901).

Figure 20:
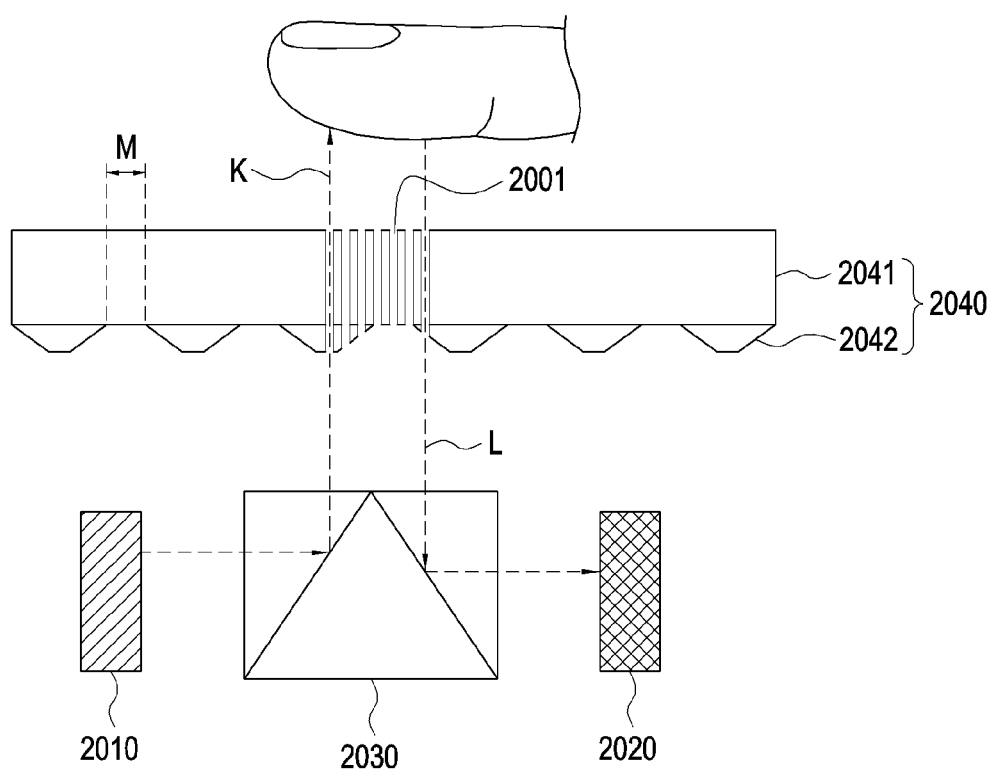
FIG. 20 discloses an optical fingerprint recognition system according to another embodiment of the present invention.

FIG. 20 discloses an optical fingerprint recognition system according to another embodiment of the present invention.

Referring to FIG. 20, an optical fingerprint recognition system (200) may comprise an infrared ray source (2010), an image sensor (2020), a reflective device (2030) and an optical film (2040).

The optical film (2040) may include a base film (2041) and a lens pattern layer (2042).

For example, the optical film (2040) may include a plurality of through holes (2001). Here, the plurality of through holes (2001) may be formed in a traveling direction (K or L) of an infrared ray to transmit the infrared ray. Accordingly, the infrared ray can transmit (or pass) the base film (2041) and the lens pattern layer (2042) at the same time. Here, the plurality of through holes (2001) may be disposed to a region corresponding to a fingerprint position with a predetermined distance.

For example, a cross-section of a plurality of prisms included in the lens pattern layer (2042) may be formed in a trapezoid shape. In this case, the trapezoid may be an equilateral trapezoid.

According to FIG. 20, the optical film (2040) can effectively transmit the infrared ray through a retained surface set by the predetermined distance (M) in the plurality of lenses (2042) and the plurality of through holes (2001). Moreover, since the cross-section of the plurality of lenses (2042) of the optical film (2040) is formed in a trapezoid shape, the infrared transmission rate can be maximized because the top surface of the plurality of lenses (2042) is flat.

Figure 21:
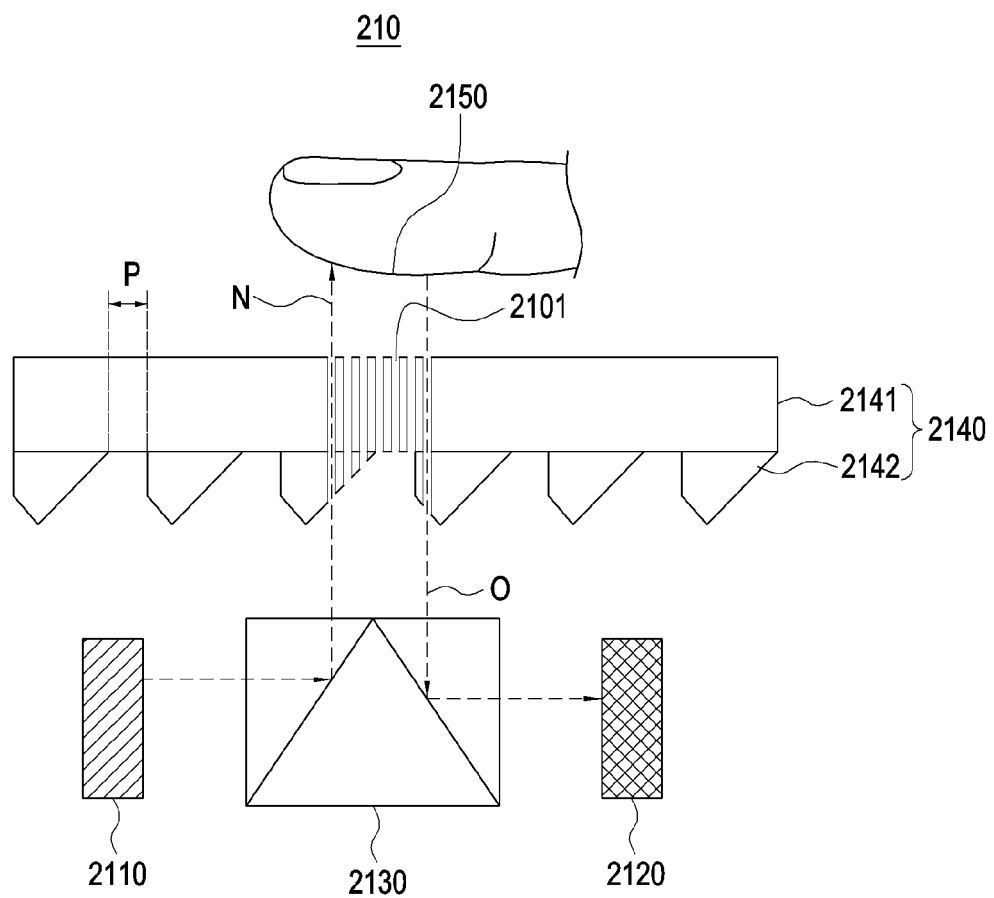
FIG. 21 discloses an optical fingerprint recognition system according to another embodiment of the present invention.

FIG. 21 discloses an optical fingerprint recognition system according to another embodiment of the present invention.

Referring to FIG. 20, an optical fingerprint recognition system (210) may comprise an infrared ray source (2110), an image sensor (2120), a reflective device (2130) and an optical film (2140).

The optical film (2140) may include a base film (2141) and a lens pattern layer (2142).

For example, the optical film (2140) may include a plurality of through holes (2101). Here, the plurality of through holes (2001) may be formed in a traveling direction (N or O) of an infrared ray to transmit the infrared ray. For instance, when the traveling direction of the infrared ray is tilted to a predetermined angle with respect to the fingerprint recognition optical film, the plurality of through holes (2101) can also be formed with a tilted angle following the traveling direction of the infrared ray. Moreover, the plurality of through holes (2101) may be disposed to a region corresponding to a fingerprint position (2150) with a predetermined distance.

The infrared ray can transmit the base film (2141) and the lens pattern layer (2142) at the same time through the plurality of through holes (2101). Here, the plurality of through holes (2101) may be disposed to a predetermined distance.

According to FIG. 21, the fingerprint recognition optical film can effectively transmit the infrared ray through the flat portion pattern in the lens pattern layer (2142) and the plurality of through holes (2101).

The plurality of the through holes (2101) in the above-described FIG. 21 can also be formed for the fingerprint recognition optical film in FIG. 16.

At least one of the optical films for fingerprint recognition (30, 43, 70, 24', 130, 140, 1540, 1640, 1740, 1840, 1940, 2040, 2140) according to a various embodiments of the present invention as described can be included in a backlight unit. Furthermore, the backlight unit can also be included in an LCD device having an LCD panel.

Thus, according to various embodiments of the present invention, an optical film for a fingerprint recognition can effectively transmit infrared rays.

According to various embodiments of the present invention, an optical film for fingerprint recognition enables recognizing a fingerprint on a screen of a small electronic device such as a smartphone thereby simplifying the display structure of the smartphone and improving user convenience.

As mentioned above, although embodiments of the present invention have been shown and described, it will be understood that those skilled in the art can make various changes in form and detail without departing from the scope of the present embodiment as defined by the appended claims and equivalents.

What is claimed is:

1. A fingerprint recognition optical film for transmitting an infrared ray, comprising:
   a base film; and
   a lens pattern layer including a plurality of lenses attached to one surface of the base film and being parallelly arranged with a first distance, and a flat portion pattern formed among the plurality of lenses to transmit the infrared ray,
   wherein a protrusion direction of the plurality of lenses is arranged to face to a light source,
   wherein at least one lens of the plurality of lenses has a first end and a second end opposite the first end, and the first end is an end of the at least one lens located closer to a vertical line drawn from a vertex of the at least one lens to the base film,
   wherein the first distance is greater than a second distance, and the second distance is defined as a distance between the vertical line drawn from the vertex of the at least one lens to the base film and the first end,
   wherein the flat portion pattern is formed to include a plurality of flat lines with the first distance as a width,
   wherein the lens pattern layer has a first area for receiving a fingerprint, and
   wherein the first distance between adjacent lenses of the plurality of lenses in a first direction in the first area is larger than a third distance which is a distance between adjacent lenses of the plurality of lenses in the first direction outside of the first area.

2. The fingerprint recognition optical film of claim 1 wherein the plurality of lenses are prisms and the prisms have a vertex angle greater than 0° and less than 90°.

3. The fingerprint recognition optical film of claim 1 wherein a cross section of the plurality of lenses is a pentagon.

4. The fingerprint recognition optical film of claim 1 wherein the first distance is set to be 2 μm, 4 μm or 6 μm.

5. The fingerprint recognition optical film of claim 1 wherein the plurality of lenses are formed by an acryl resin including an infrared absorbent.

6. The fingerprint recognition optical film of claim 1 wherein each of the plurality of lenses includes:
 a first light incident surface forming a first angle with the flat portion pattern of the base film; and
 a second light incident surface forming a second angle with the first light incident surface.

7. The fingerprint recognition optical film of claim 6 wherein the first angle is approximately 90° angle and the second angle is larger than 90° angle and smaller than 180° angle.

8. The fingerprint recognition optical film of claim 6 wherein the plurality of lenses further include a first reflecting surface forming a third angle with the second light incident surface.

9. The fingerprint recognition optical film of claim 8 wherein the plurality of lenses further include a second reflecting surface forming a fourth angle with the first reflecting surface and forming a fifth angle with the base film.

10. The fingerprint recognition optical film of claim 9 wherein the plurality of lenses include a first and a second lens continuously disposed on the base film, and
 wherein the first lens is disposed on a position where a virtual surface which is the extended from the second light incident surface of the second lens and the base film is cross each other.

11. The fingerprint recognition optical film of claim 1 wherein the base film and the lens pattern layer include a plurality of through-holes formed in a direction where the infrared ray transmits.

12. The fingerprint recognition optical film of claim 11 wherein a longest distance between two through-holes among the plurality of through-holes is less than the first distance.

13. The fingerprint recognition optical film of claim 11 wherein the plurality of through-holes are disposed with the first distance to a region corresponding to the first area for receiving the fingerprint.

14. The fingerprint recognition optical film of claim 1 wherein the base film is a reflective polarizing sheet transmitting one polarization and reflecting other polarization.

15. The fingerprint recognition optical film of claim 1 wherein the flat portion pattern is formed to a region corresponding to the first area for receiving the fingerprint.

16. A backlight unit comprising a fingerprint recognition optical film comprising;
 a base film; and
 a lens pattern layer including a plurality of lenses attached to one surface of the base film and being parallelly arranged with a first distance and a flat portion pattern formed among the plurality of lenses to transmit an infrared ray,
 wherein a protrusion direction of the plurality of lenses is arranged to face to a light source,
 wherein at least one lens of the plurality of lenses has a first end and a second end opposite the first end, and the first end is an end of the at least one lens located closer to a vertical line drawn from a vertex of the at least one lens to the base film,
 wherein the first distance is greater than a second distance, and the second distance is defined as a distance between the vertical line drawn from the vertex of the at least one lens to the base film and the first end,
 wherein the flat portion pattern is formed to include a plurality of flat lines with the first distance as a width,
 wherein the lens pattern layer has a first area for receiving a fingerprint, and
 wherein the first distance between adjacent lenses of the plurality of lenses in a first direction in the first area is larger than a third distance which is a distance between adjacent lenses of the plurality of lenses in the first direction outside of the first area.

17. A liquid crystal display (LCD) device comprising:
 a LCD (liquid crystal display) panel; and
 a backlight unit located under the LCD panel and comprising a fingerprint recognition optical film, the fingerprint recognition optical film comprising:
 a base film; and
 a lens pattern layer including a plurality of lenses attached to one surface of the base film and being parallelly arranged with a first distance and a flat portion pattern formed among the plurality of lenses to transmit an infrared ray,
 wherein a protrusion direction of the plurality of lenses is arranged to face to a light source,
 wherein at least one lens of the plurality of lenses has a first end and a second end opposite the first end, and the first end is an end of the at least one lens located closer to a vertical line drawn from a vertex of the at least one lens to the base film,
 wherein the first distance is greater than a second distance, and the second distance is defined as a distance between the vertical line drawn from the vertex of the at least one lens to the base film and the first end,
 wherein the flat portion pattern is formed to include a plurality of flat lines with the first distance as a width,
 wherein the lens pattern layer has a first area for receiving a fingerprint, and
 wherein the first distance between adjacent lenses of the plurality of lenses in a first direction in the first area is larger than a third distance which is a distance between adjacent lenses of the plurality of lenses in the first direction outside of the first area.

* * * * *